G. W. POND.
Apparatus for Preparing Roofing Felt.

No. 134,002. Patented Dec. 17, 1872.

Witnesses:
N. W. Almquist
Alex F. Roberts

Inventor:
G. W. Pond
PER Munn & Co
Attorneys.

UNITED STATES PATENT OFFICE.

GEORGE W. POND, OF BROOKLYN, NEW YORK, ASSIGNOR TO HIMSELF, J. W. SMITH, AND J. W. COOLIDGE, OF SAME PLACE.

IMPROVEMENT IN APPARATUS FOR PREPARING ROOFING-FELT.

Specification forming part of Letters Patent No. 134,002, dated December 17, 1872.

*To all whom it may concern:*

Be it known that I, GEORGE W. POND, of Brooklyn, in the county of Kings and State of New York, have invented a new and useful Improvement in Machines for Manufacturing Roofing-Felt, of which the following is a specification:

The object of the present invention is to improve the machinery employed in manufacturing what is known as roofing-felt; and it consists in making the frames of the rollers upon which the felt or paper is rolled adjustable so that the different rolls of felt or paper, when being drawn from those rollers to be joined together between the feed or compressing-rollers, will meet with their edges even and be uniform with each other, thereby obviating the necessity of shearing off the edges of the felt to make them even. It also consists in a device for adjusting the uprights which support the roller to suit the width of the felt or paper, all as will be hereinafter more fully described.

Figure 1:
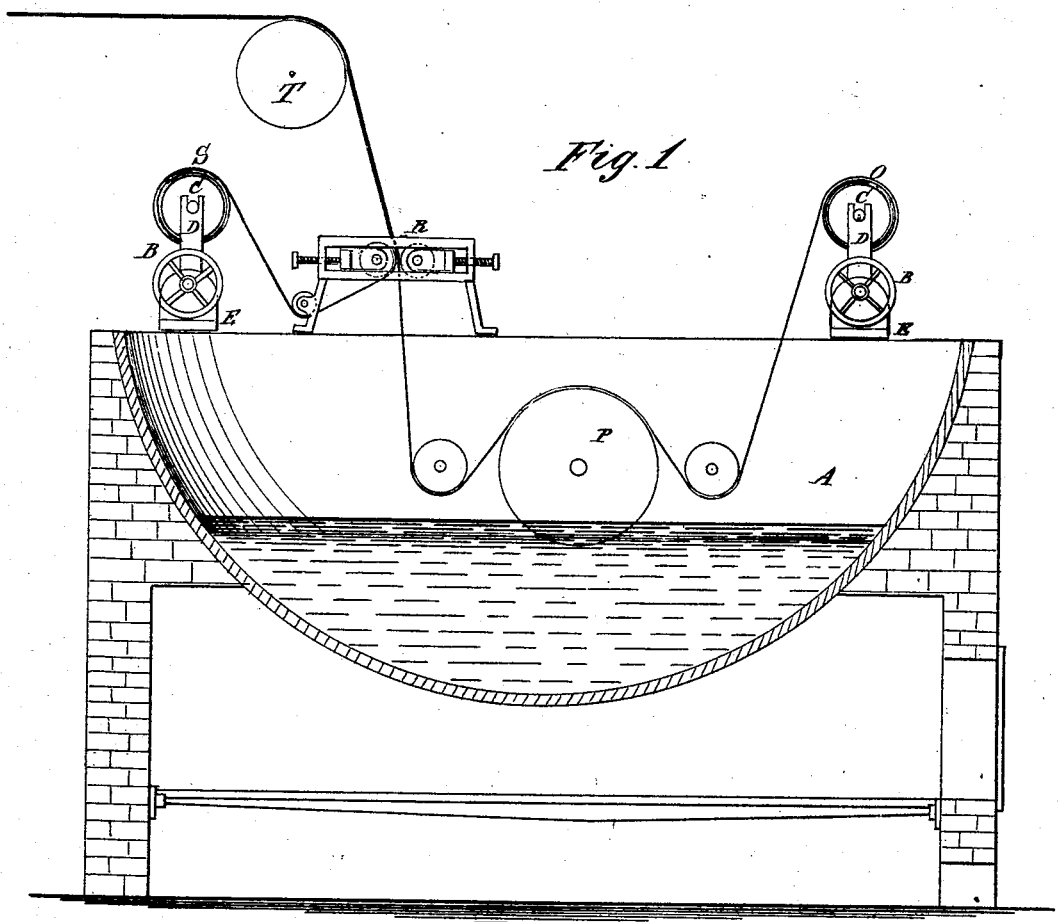
Figure 2:
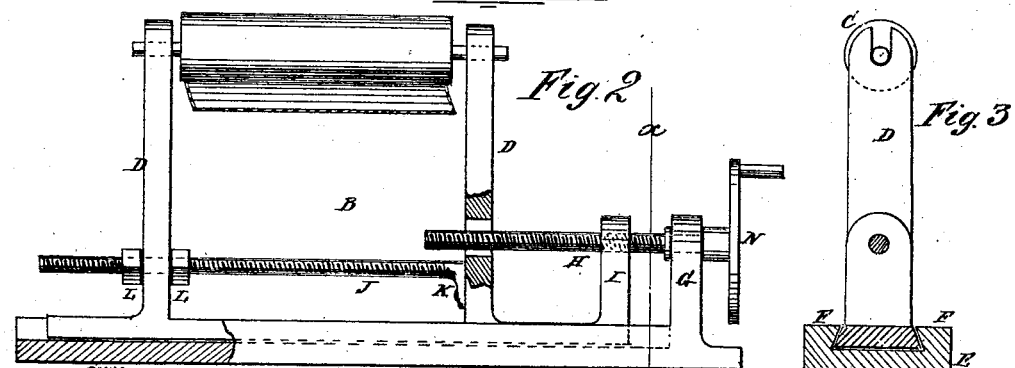
Figure 3:
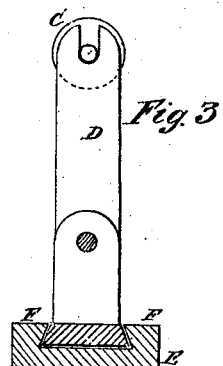

In the accompanying drawing, Figure 1 represents a vertical longitudinal section of a roofing-felt machine complete; Fig. 2 is a side view of the roller-frame, which part constitutes my improvement; and Fig. 3 is a vertical section of Fig. 2 taken on the line *x x*.

Similar letters of reference indicate corresponding parts.

A represents a tank or vessel which contains the hot tar or saturating material. Upon the top of this vessel the machinery, or the main portion thereof employed in manufacturing the felt, is placed. B represents the roller-frame. Two or more of these frames, according to the thickness or "ply" of the felt, are employed.

The drawing represents a machine for manufacturing "two-ply" roofing-felt; consequently two frames, each carrying a roll of felt or paper, are represented.

C is the roller or cylinder around which the felt is wound. D are the roller-uprights. E is the bed of the roller-frame. F F are strips on the top of the bed, which form a dovetail groove, in which the uprights slide. (See Fig. 3.) G is an upright, which is stationary on the bed. H is a screw confined by means of collars in the upright G so that it has no longitudinal motion, while it is allowed to revolve freely. I is a stand attached to one of the roller-uprights, in which the screw works as in a nut. J is a screw-rod by which the two roller uprights are connected together. This rod is rigidly attached to one upright, as seen at K, and passes through the other upright with a screw-nut, L, on each side thereof. N is a hand-wheel on the end of the screw H. When the hand-wheel is turned both uprights D D are made to slide on the bed and move the roller in either direction, according as the screw is turned. The uprights D D are adjusted as to distance from each other to suit felt of different widths by means of the screw-rod J and nuts L L. O is the roll of felt or paper, which is to be saturated on one side by the revolving cylinder P, over which the felt passes. From the saturating-cylinder it passes to the feed and compressing rollers R, where it meets with the paper or felt from the other roller S. The felt from the two rolls is pressed and cemented together by the compressing-rollers R, and then passed up over the cylinder I, and dried and rolled up for use.

The difficulty has heretofore been to join the sheets of felt together with their edges even. With the old apparatus it is impossible to do this, and consequently the edges have to be sheared off, and much of the felt is wasted thereby.

By my method the rolls of felt are adjusted so that the edges are made to exactly meet, which renders any cutting or shearing unnecessary; thereby saving much time in the process, a heavy expense for the necessary shears, besides the saving of much of the material itself.

Having thus described my invention, I claim as new and desire to secure by Letters Patent—

Laterally-adjustable felt or paper rolls C C, applied, in connection with tarring and compressing rolls, as described, to enable the edges of the layers to be evenly adjusted to each other, and thus to obviate the necessity of subsequent shearing.

GEO. W. POND.

Witnesses:
H. N. TAFT,
ALEX. F. ROBERTS.